United States Patent [19]

Corrigan

[11] Patent Number: 5,275,632
[45] Date of Patent: Jan. 4, 1994

[54] REFORMER SUPPORT ARRANGEMENT

[75] Inventor: Thomas J. Corrigan, Vernon, Conn.

[73] Assignee: International Fuel Cells Corporation, South Windsor, Conn.

[21] Appl. No.: 772,755

[22] Filed: Oct. 7, 1991

[51] Int. Cl.5 ............................ B01J 7/00; B01J 8/06
[52] U.S. Cl. ............................... 48/94; 48/127.9; 422/197; 422/204
[58] Field of Search ............... 48/94, 127.9; 422/196, 422/197, 202, 203, 204, 205; 429/17, 19

[56] References Cited

U.S. PATENT DOCUMENTS

| | | | |
|---|---|---|---|
| 1,936,610 | 11/1933 | Thomas | 422/197 |
| 3,645,701 | 2/1972 | Banchik et al. | 48/127.9 |
| 3,656,913 | 4/1972 | Blaha et al. | 48/127.9 |
| 4,098,589 | 7/1978 | Buswell et al. | 422/197 |
| 4,729,931 | 3/1988 | Grimble | 429/17 |
| 4,820,314 | 4/1989 | Cohen et al. | 422/197 |
| 4,861,347 | 8/1989 | Szydlowski et al. | 48/61 |
| 4,921,680 | 5/1990 | Bonk et al. | 422/197 |

*Primary Examiner*—Peter Kratz
*Attorney, Agent, or Firm*—Edward L. Kochey, Jr.

[57] ABSTRACT

A gas fired reformer includes a plurality of bayonet type reformers, each having a vertical outlet tube posted on a common outlet header. Three outlet header continuation members pass downwardly through the reformer shell to a ground support, at least one of these being a reformer gas outlet line.

5 Claims, 3 Drawing Sheets

REFORMER SUPPORT ARRANGEMENT

TECHNICAL FIELD

The invention relates to high temperature gas reformers and in particular to bottom support thereof.

BACKGROUND OF THE INVENTION

Hydrocarbon fuel reformers are used in fuel cell power plants. They take raw hydrocarbon fuel such as natural gas, propane, or naphtha and catalytically convert the raw fuel to a hydrogen rich fuel gas suitable for use as an anode fuel. Raw fuel is percolated through catalyst beds which are contained in tubes mounted within the reformer housing.

Catalytic conversion is carried out at elevated temperatures in the range of 800 F. to 1700 F. The reformer includes a pressure vessel as the reformer shell within which a burner is operated to establish these elevated temperatures.

Reactors are in the form of bayonet tubes with an upward flow in the outer portion through the catalyst bed and a downward flow through the inner portion, providing some counterflow heat recovery to the reformed gas from the incoming gas. The flue gas passes in heat exchange relationship with the outer surface of the bayonet tubes. It is maintained in close contact therewith by surrounding sleeves with a baffle or seal plate forcing the flue gas through its allotted area.

In the past the components of the reformer gas flowpath have been supported from the side of the shell. This requires additional structure for the low pressure shell since it must now carry additional load. Furthermore, the shell penetrations for the reformed gas outlet have been expensive because of the differential movement caused by differential expansion during operating conditions.

SUMMARY OF THE INVENTION

The impervious shell of a bottom supported gas fired reformer is comprised of a shell bottom plate, a cylindrical shell housing, and a shell head. A plurality of bayonet type reactors are annularly arranged within the shell. Each reactor has a central tube for the downflow of reformer gas and an outer casing forming an annulus for the upflow of reformer gas.

A reformer gas outlet header is located below and passes beneath all of the reactors within the shell. An outlet tube extension of each of the central tubes of the regenerators passes directly down and is connected to the outlet header, thereby forming a support for the reactors from the outlet header. At least three outlet header support members extend directly down from the outlet header to the shell bottom plate where they are secured to the bottom plate. At least one of these members is a reformer gas outlet.

Extending downwardly beyond the support members are three outlet header support continuation members extending down to a ground support elevation. At least one of these members is comprised at least in part of a reformer gas outlet line.

A burner is centrally located within the shell and supported from the center of the bottom plate. One of the support members and support member extensions is comprised of a burner exhaust.

DESCRIPTION OF THE PREFERRED EMBODIMENT

Figure 1:
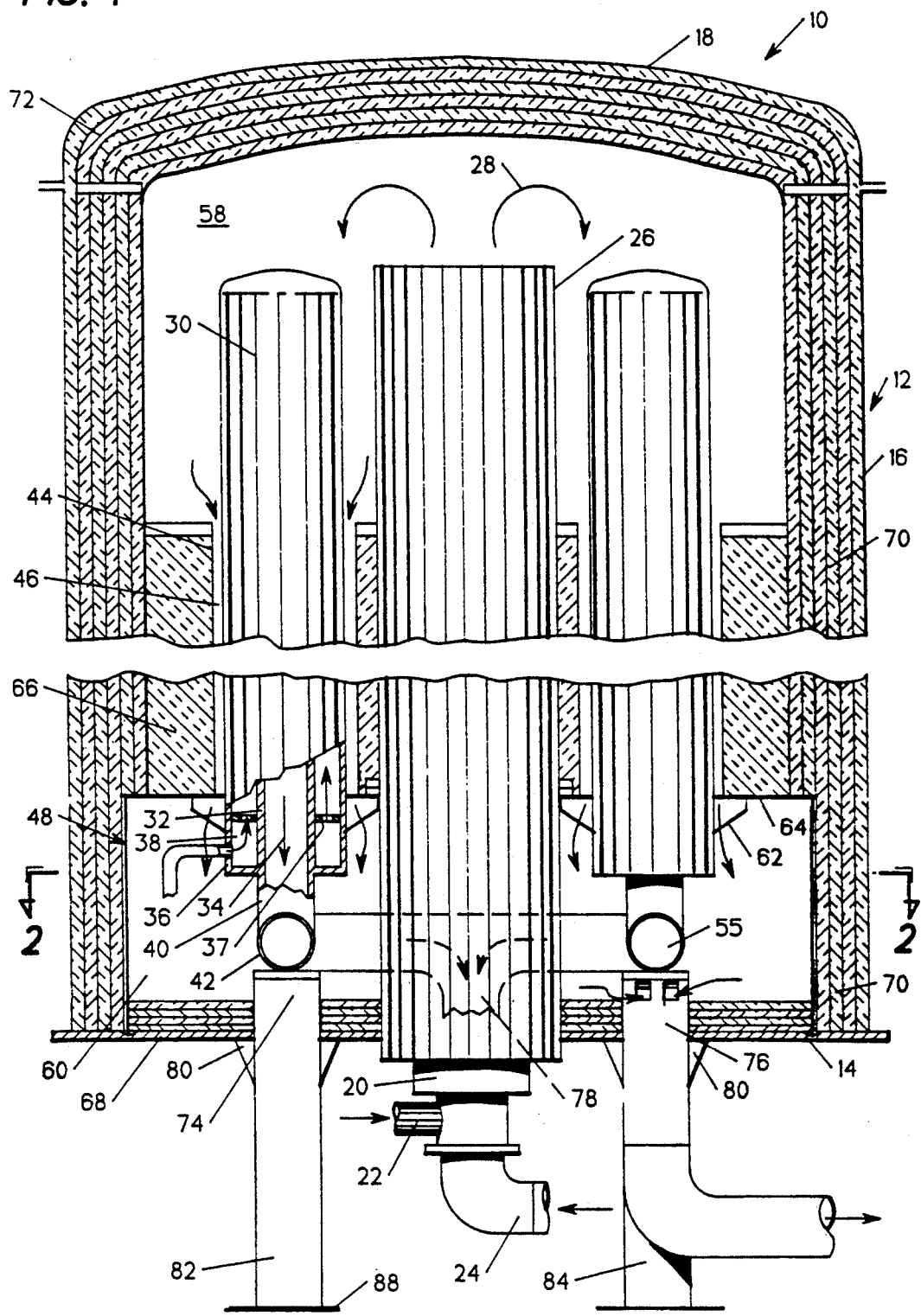
FIG. 1 is a sectional side elevation through the reformer.

Referring to FIG. 1, the gas reformer 10 includes an impervious shell 12 formed of a shell bottom plate 14, a cylindrical shell housing 16 and a shell head 18. These are welded or bolted together at flanged connections and the shell functions to contain the combustion products from burner 20.

This burner has a fuel inlet 22 and an air inlet 24 and is centrally supported from the bottom plate 14. Combustion products pass to the top of the shell through liner 26 and outwardly as shown by arrows 28 from the top of the burner tube.

Figure 2:
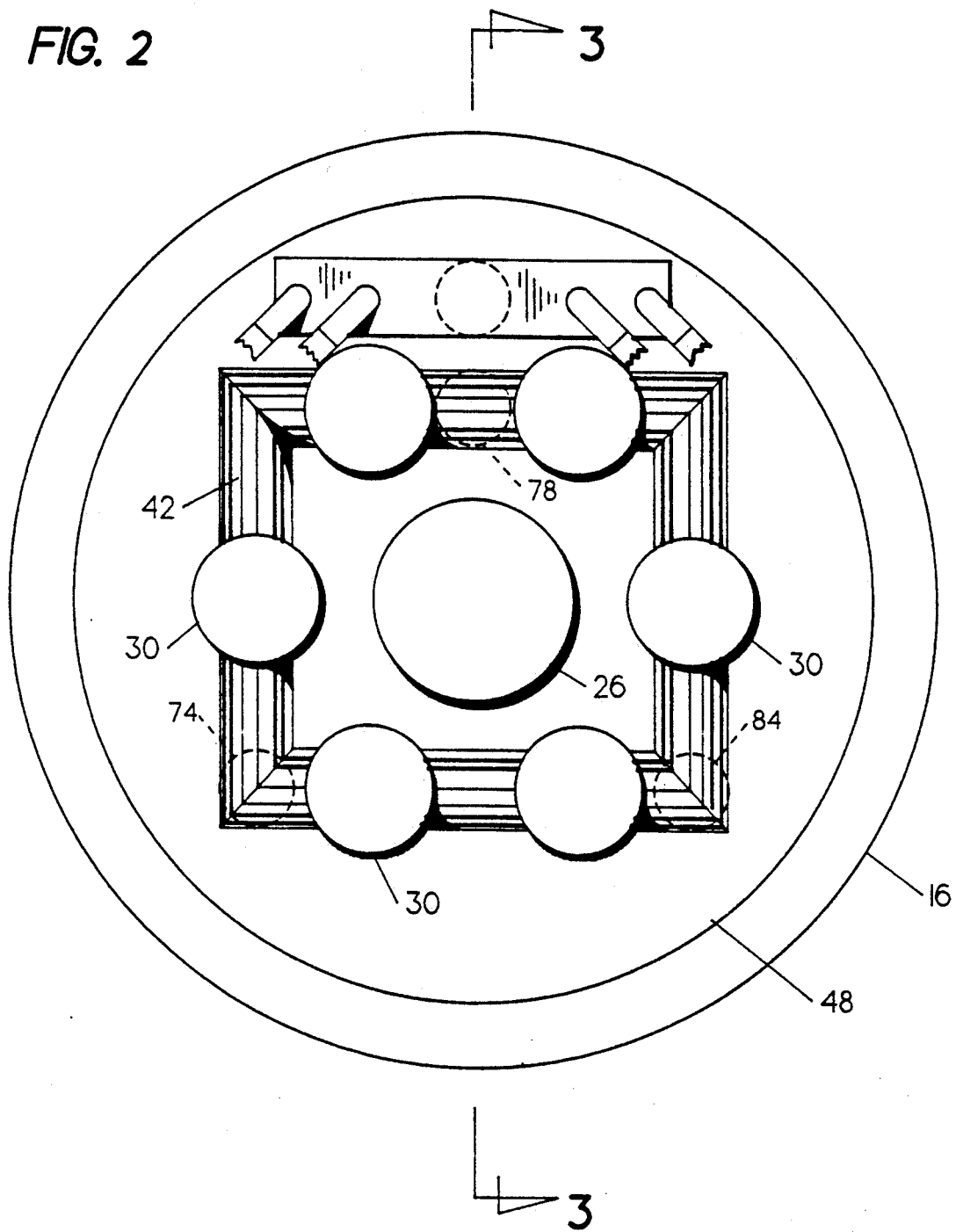
FIG. 2 is a sectional top view through the reformer.

A plurality of bayonet type reactors 30 are located within the shell, the annular arrangement of these being best seen in FIG. 2. Each reactor has a central tube 32 for the downflow 34 of reformer gas. An outer casing 36 forms an annular space 38 for the upflow of reformer gas. Plate 37 supports the catalyst.

An outlet tube extension 40 carries the reformer gas to a reformer gas outlet header 42 located below and passing beneath all of reactors 30. This outlet tube extension is directly connected to the outlet header and supports the reactors from the outlet header.

A sleeve 44 surrounds the lower portion of each reactor for the purpose of confining the flow of combustion products to the annular space 46. This space includes spiral rods to facilitate the mixing of the combustion products and to increase the heat transfer coefficient. This sleeve cooperating with baffle or seal plate 48 forces the combustion products to pass from gas plenum 58 to the outlet plenum 60 through the annular space 46.

Figure 3:
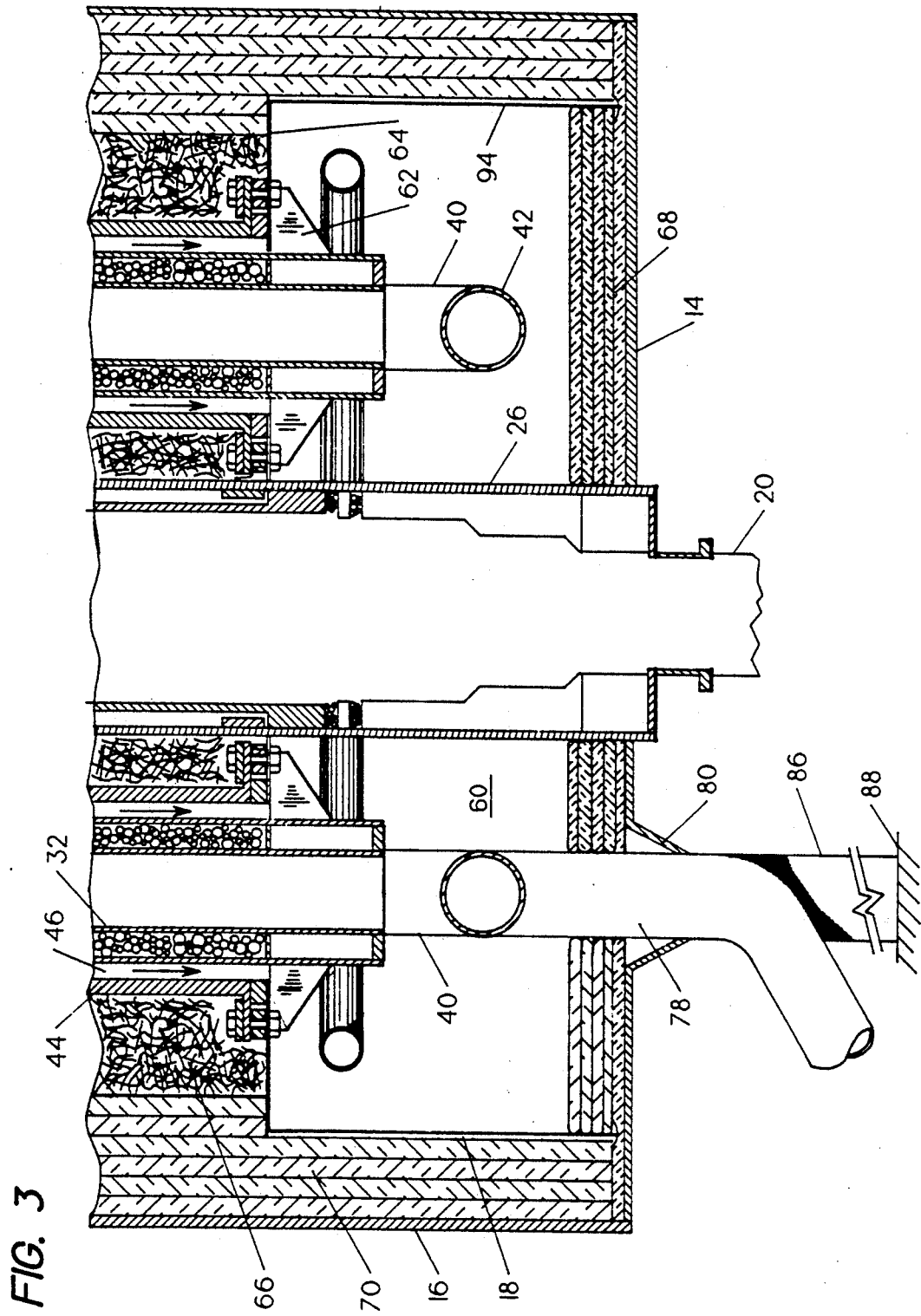
FIG. 3 is a sectional side elevation through the lower portion of the reformer.

As shown in more detail in FIG. 3, support leg 62 on each reactor supports the horizontal portion 64 of the seal plate. This seal plate in turn supports the sleeves 44 as well as loose fill insulation 66.

Shell bottom plate 14 is protected from the 770 F. gas in outlet plenum 60 by blanket insulation 68. The cylindrical shell housing 16 and head 18 are protected from the interior gases by insulation 70 and 72. Ceramic board insulation 72 protects head 18.

Three outlet header support members 74, 76 and 78 support the outlet header 42 and pass directly down to bottom plate 14 where they are welded to the plate through thermal sleeves 80. These thermal sleeves accommodate the local differential expansion between the support member and the bottom plate and provide a gradual thermal gradient. They also provide some flexibility for relative horizontal movement of the support members with respect to the bottom plate. They are, however, stiff in the vertical direction so that they transmit load in this direction between the support members 74, 76 and 78 and the bottom plate 14.

Outlet header support continuation members 82, 84 and 86 extend directly downwardly from the outlet header support members to a ground support location 88. One of the support members 78 and 86 comprises a reformer gas outlet from the outlet header which permits the reformer gas outlet line to not only accomplish the shell penetration, but also act as a mutual support between the internal pressure parts and the shell as well as a support from the ground.

A second support member 76 and 84 comprises the combustion gas product outlet from outlet plenum 60.

A third leg 74 and 82 is free of all gas products. Preferably the outlet header 42 is arranged to slide on the support connections 76 and 74 with its relative location dictated by the direct connection of the support leg 78.

It can be seen that the joint between the support structure and the bottom plate permits the internal pressure parts including the reactors 30 to move up and down relative to the shell 12. Horizontal movement caused by expansion is a function not of the temperatures within the shell nor of the outlet header, but only the differential between the bottom plate 14 and the ground. This nominal differential expansion can readily be accepted by the thermal sleeves 80.

The combination of the required gas flow penetrations with the structural support simplifies the construction. While more than three supports could be used, the use of only three supports is preferred because of the potential temperature differentials, particularly during transients. The use of three supports permits predictable load distribution.

What is claimed is:

1. A bottom supported gas fired reformer arrangement comprising:
   a bottom support for said reformer;
   a shell bottom plate;
   a cylindrical shell housing;
   a shell head;
   said bottom plate, said shell housing, and said shell head connected to form an impervious shell;
   a gas firing means forming combustion products supported from said impervious shell and firing into an upper end portion of said impervious shell;
   a plurality of bayonet type reactors, each having a central tube for the downflow of reformer gas and an outer casing forming an annulus for the upflow of reformer gas, said reactors annularly arranged within said impervious shell;
   a reformer gas outlet header located within said shell below and passing beneath all of said reactors;
   an outlet tube extension of each of said central tubes directly connected to said outlet header as a support member for said reactors, and said impervious shell providing a lower combustion gas outlet plenum internal of said impervious shell and beneath said reactors;
   at least three outlet header support members supporting said outlet header and passing directly downwardly to said shell bottom plate, and secured to said bottom plate; and
   at least one of said outlet header support members comprising a reformer gas outlet line carying reformer gas from said outlet header.

2. A reformer as in claim 1 wherein said bottom support comprises:
   at least three outlet header support continuation members extending directly downwardly from said outlet header support members to a ground support location, at least one of said outlet header support continuation members comprising, at least in part, a reformer gas outlet line from said outlet header.

3. A reformer as in claim 2:
   said gas firing means comprising a burner for burning fuel and creating combustion products arranged to discharge combustion products into an upper portion of said impervious shell;
   said shell having a bottom end;
   said combustion gas outlet plenum internal of said shell being located at the bottom end thereof;
   means defining a flowpath for passing said combustion products in heat exchange relationship with said reactors comprising a passage from said upper portion of said impervious shell to said outlet plenum; and
   one of said outlet header support members comprising a burner exhaust receiving combustion products from said outlet plenum.

4. A reformer as in claim 3:
   said reformer having a vertical centerline;
   said burner comprising a central burner for burning fuel and creating combustion products located substantially on the vertical centerline of said reformer, and supported from said bottom plate.

5. A reformer as in claim 3:
   one of said outlet header support members arranged to carry reformer gas exhaust;
   one of said outlet header support members arranged to carry combustion products; and
   one of said outlet header support members free of both said reformer gas exhaust and said combustion products.

* * * * *